(12) United States Patent
Peixoto

(10) Patent No.: US 9,707,699 B2
(45) Date of Patent: Jul. 18, 2017

(54) METHOD FOR PRODUCING A PRECAST CONCRETE SEGMENT OF A WIND TURBINE TOWER, AND A PRECAST CONCRETE TOWER SEGMENT FORMWORK

(71) Applicant: Wobben Properties GmbH, Aurich (DE)

(72) Inventor: Carlos Peixoto, Joane (PT)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/905,252

(22) PCT Filed: Jul. 11, 2014

(86) PCT No.: PCT/EP2014/064965
§ 371 (c)(1),
(2) Date: Jan. 14, 2016

(87) PCT Pub. No.: WO2015/007656
PCT Pub. Date: Jan. 22, 2015

(65) Prior Publication Data
US 2016/0151932 A1 Jun. 2, 2016

(30) Foreign Application Priority Data

Jul. 17, 2013 (DE) .......................... 10 2013 213 976

(51) Int. Cl.
*E04B 5/04* (2006.01)
*B28B 23/00* (2006.01)
(Continued)

(52) U.S. Cl.
CPC ............ *B28B 23/0056* (2013.01); *B28B 1/14* (2013.01); *B28B 23/005* (2013.01); *E04H 12/12* (2013.01);
(Continued)

(58) Field of Classification Search
CPC ..... B28B 23/0056; B28B 23/005; B28B 1/14; E04H 12/12; F03D 11/045
(Continued)

(56) References Cited

U.S. PATENT DOCUMENTS 3,503,584 A * 3/1970 Erhart .................. E04B 1/4157
249/187.1
3,685,783 A * 8/1972 Hilson .................. B28B 23/005
238/377
(Continued)

FOREIGN PATENT DOCUMENTS

CN 101126284 A 2/2008
CN 103132494 A 6/2013
(Continued)

*Primary Examiner* — Basil Katcheves
(74) *Attorney, Agent, or Firm* — Seed Intellectual Property Law Group LLP

(57) ABSTRACT

A method for producing a precast concrete tower segment of a wind turbine tower is provided. An inner formwork having at least one bore and at least one holding unit on an inner side of the inner formwork in the region of the bore is placed. A first end of a concrete anchor or a first end of a removable element at the first end of the concrete anchor is introduced from the outer side of the inner formwork through the bore into the holding unit in order to hold the concrete anchor. An outer formwork is placed. Concrete is introduced between the inner and outer formwork. The removable element in the first end or the first end of the concrete anchor is removed and the precast concrete segment is removed.

6 Claims, 5 Drawing Sheets

(51) Int. Cl.
    *B28B 1/14*    (2006.01)
    *E04H 12/12*   (2006.01)
    *F03D 11/04*   (2006.01)
    *F16B 37/08*   (2006.01)

(52) U.S. Cl.
    CPC ........ *F03D 11/045* (2013.01); *F16B 37/0857* (2013.01)

(58) Field of Classification Search
    USPC ................... 52/604, 223.3, 223.4, 229, 292
    See application file for complete search history.

(56) References Cited

U.S. PATENT DOCUMENTS

| | | | |
|---|---|---|---|
| 5,081,811 A | 1/1992 | Sasaki | |
| 5,878,540 A * | 3/1999 | Morstein | E02D 27/42 52/292 |
| 6,007,284 A * | 12/1999 | Taneichi | E04B 1/2604 411/267 |
| 6,277,316 B2 * | 8/2001 | Kistner | 264/229 |
| 6,315,077 B1 | 11/2001 | Peacock et al. | |
| 7,108,101 B1 | 9/2006 | Westhoff et al. | |
| 8,201,381 B2 * | 6/2012 | Heath | E04B 1/4157 52/698 |
| 8,220,214 B1 * | 7/2012 | Purdy | E02D 27/42 248/678 |
| 8,322,093 B2 * | 12/2012 | Zavitz | E04H 12/12 405/250 |
| 8,381,487 B2 | 2/2013 | Gomez et al. | |
| 8,418,413 B2 * | 4/2013 | Marmo | E02D 27/42 52/167.4 |
| 8,439,620 B2 * | 5/2013 | Mellyn | F16B 37/0807 411/188 |
| 8,844,237 B2 | 9/2014 | Kapitza et al. | |
| 2003/0000165 A1 * | 1/2003 | Tadros | E04C 3/22 52/223.4 |
| 2008/0155907 A1 * | 7/2008 | Wobben | E02D 27/42 52/169.13 |
| 2008/0302038 A1 * | 12/2008 | Wobben | E02D 27/42 52/296 |
| 2009/0000227 A1 * | 1/2009 | Jakubowski | E04H 12/085 52/223.4 |
| 2009/0324364 A1 * | 12/2009 | Smith | F16B 37/0857 411/433 |
| 2010/0146890 A1 * | 6/2010 | Kristensen | E02D 27/42 52/297 |
| 2010/0325986 A1 * | 12/2010 | Maestre | E04H 12/085 52/223.3 |
| 2011/0138704 A1 * | 6/2011 | Bagepalli | E04H 12/12 52/147 |
| 2012/0260591 A1 * | 10/2012 | Holscher | B28B 1/008 52/294 |
| 2012/0291380 A1 * | 11/2012 | Tooman | E02D 27/42 52/297 |
| 2013/0081350 A1 * | 4/2013 | Bogl | E04H 12/08 52/651.01 |
| 2014/0033628 A1 * | 2/2014 | Lockwood | E04H 12/16 52/223.5 |

FOREIGN PATENT DOCUMENTS

| | | |
|---|---|---|
| DE | 1684221 A1 | 4/1971 |
| DE | 102010005991 A1 | 7/2011 |
| DE | 102013213976 A1 | 1/2015 |
| EP | 0050798 A1 | 5/1982 |
| GB | 1250008 A | 10/1971 |
| TW | 258772 B | 10/1995 |
| TW | 201135036 A | 10/2011 |
| TW | 201144590 A | 12/2011 |
| WO | 9516140 A1 | 6/1995 |

* cited by examiner

METHOD FOR PRODUCING A PRECAST CONCRETE SEGMENT OF A WIND TURBINE TOWER, AND A PRECAST CONCRETE TOWER SEGMENT FORMWORK

BACKGROUND

Technical Field

The present invention relates to a method for producing a precast concrete segment of a wind turbine tower and to a precast concrete tower segment formwork.

Description of the Related Art

A tower of a wind turbine consists for example of a plurality of concrete segments where the tower in question is a concrete tower. The respective concrete segments are stacked on one another and can be braced with one another by means of steel cables or steel cords.

When producing concrete segments of a wind turbine tower, an inner formwork and an outer formwork are provided. Between them can be provided a metal cage or a reinforcement for improving the static behavior of the concrete segment. When the inner and the outer formwork have been constructed, concrete can then be introduced into the volume between the inner and outer formwork. After the concrete has been cured, the outer formwork can be removed and the concrete segment can be transported away for further processing.

Various installation parts, such as, for example, a climbing ladder or the like, must be provided within the tower of the wind turbine. These installation parts must of course be fastened securely to or within the tower wall (of the concrete segment). The fastening must also proceed in such a way that the static behavior of the tower is not negatively influenced as a result.

The installation parts can be installed in that, for example, holes are bored at the appropriate points and the installation parts are then fastened, for example by means of dowels, in or on the tower wall.

In the priority-founding German application, the German Patent and Trade Mark Office searched the following documents: DE 16 84 221, U.S. Pat. No. 6,315,077 B1 and U.S. Pat. No. 7,108,101 B1.

BRIEF SUMMARY

One or more embodiments of the present invention is to provide a method for producing precast concrete segments of a wind turbine tower which may provide a more cost-effective production of the concrete segments.

Therefore, a method for producing a precast concrete tower segment of a wind turbine tower is provided. An inner formwork having at least one bore and at least one holding unit on an inner side of the inner formwork in the region of the bore is placed. A first end of a concrete anchor or a first end of a removable element at the first end of the concrete anchor is introduced from the outer side of the inner formwork through the bore into the holding unit in order to hold the concrete anchor. An outer formwork is placed. Concrete is introduced or poured between the inner and outer formwork. The removable element in the first end or the first end of the concrete anchor is removed and the precast concrete segment is removed.

According to a further aspect of the present invention, the holding unit is designed in such a way that the removable element or the first end of the concrete anchor is introduced in one direction and blocked in an opposite direction.

According to a further aspect of the present invention, the holding unit has a spring action when introducing the removable element and a locking action in the opposite direction.

According to a further aspect of the present invention, the first end of the concrete anchor has an internal thread into which a removable end can be screwed and by means of which attachment or installation parts can be fastened in the tower segment.

One or more embodiments of the invention relate to a concept of providing bores at the appropriate points in the inner formwork and also of providing holding units on the inner side of the inner formwork at the bores before the outer formwork is mounted (for example after the lattice bars for reinforcing the concrete segment are mounted). This can be carried out by welding the holding units to the inner side of the inner formwork. A first end of a concrete anchor can then be introduced through the bore in the inner formwork into the holding unit, where the concrete anchor is held. The outer formwork can then be placed and the concrete can be introduced into the volume between the inner and outer formwork. After the concrete has cured, the outer formwork can be mounted. The concrete segment can then be lifted from the inner formwork. The inner formwork can optionally remain where it is and the holding unit can optionally still remain on the inner formwork or can be removed.

At the free end of the concrete anchor there can be provided a removable element, for example in the form of a screw which engages in the holding unit and is held by the holding unit. The removable element can be removed before removal of the inner formwork. The inner formwork can then be removed together with the holding unit or units. Thus, the concrete segment remains with a plurality of holes on the inner side of the concrete segment which are in each case firmly connected to the concrete formwork via the concrete anchor.

Further refinements of the invention form the subject matter of the dependent claims.

BRIEF DESCRIPTION OF THE SEVERAL VIEWS OF THE DRAWINGS

Advantages and exemplary embodiments of the invention are explained in more detail below with reference to the drawing.

DETAILED DESCRIPTION

Figure 1:
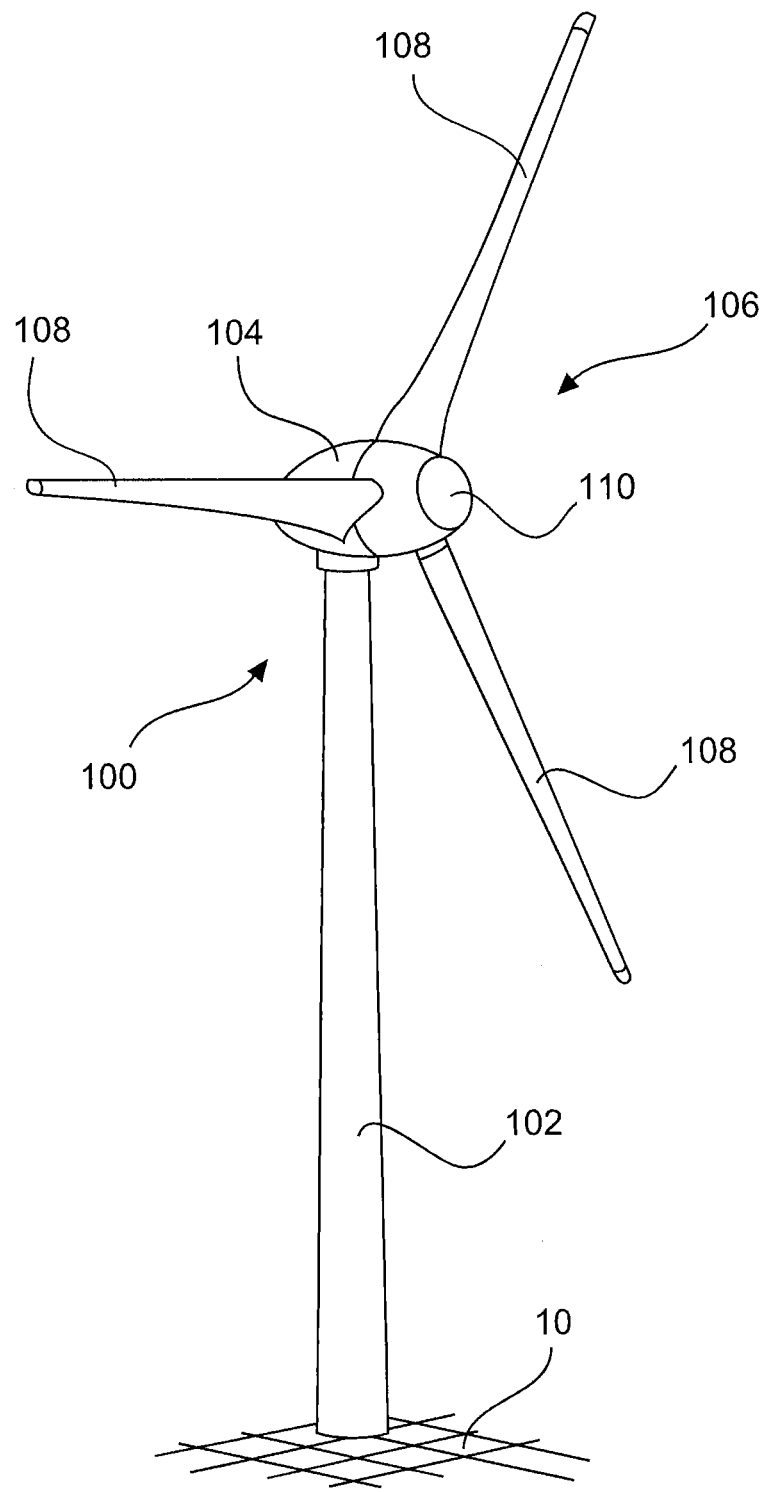
FIG. 1 shows a schematic representation of a wind turbine according to the invention.

FIG. 1 shows a schematic representation of a wind turbine according to one embodiment of the invention. The wind turbine 100 has a tower 102 and a nacelle 104. A rotor 106 having three rotor blades 108 and a spinner 110 is provided on the nacelle 104. During operation, the rotor 106 is set in a rotary movement by the wind and thus also rotates the rotor of the generator in the nacelle 104. The pitch angle of the rotor blades 108 can be adjusted by pitch motors at the rotor blade roots of the respective rotor blades 108. The tower 102 can be constructed from a plurality of tower segments or tower sections 200.

Figure 2:
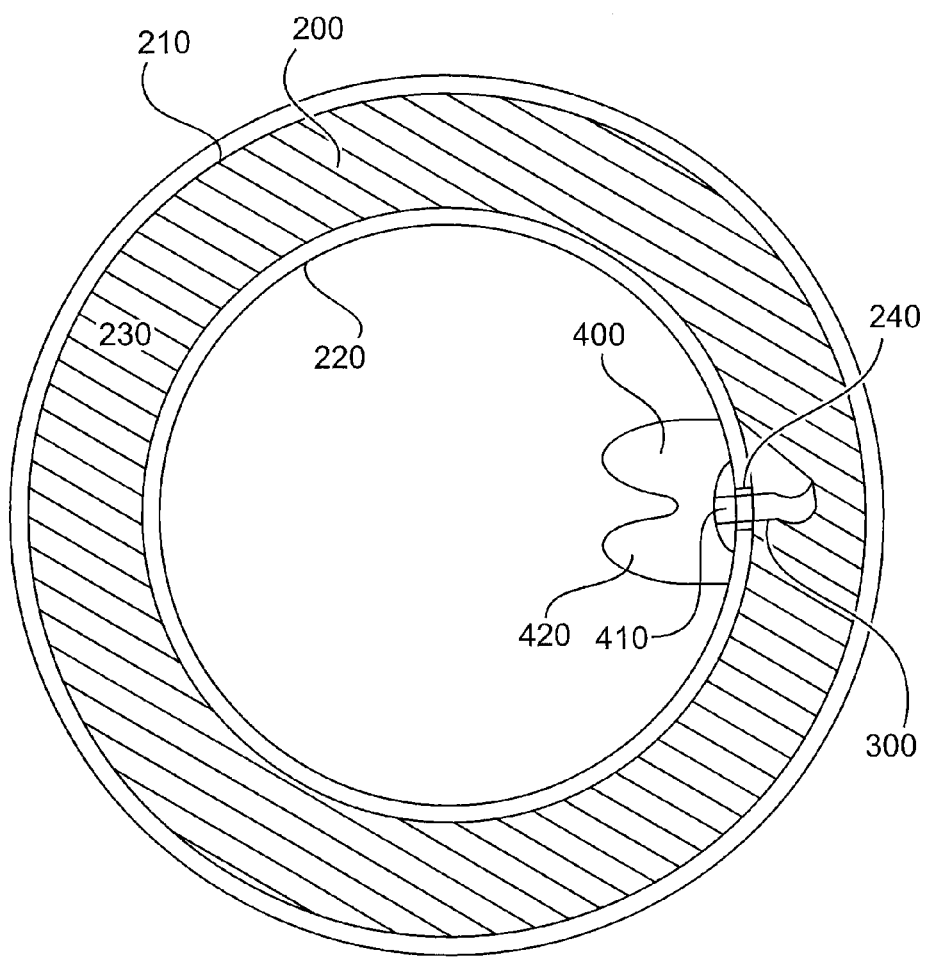
FIG. 2 shows a schematic sectional view of a precast concrete part of a tower segment of a tower of a wind turbine according to a first exemplary embodiment.

FIG. 2 shows a sectional view of a precast concrete tower segment for a tower of a wind turbine during its production according to a first exemplary embodiment. To produce the concrete tower segment, an inner formwork 220 having at least one holding unit 400 in the region of at least one hole 240 in the inner formwork 220 and on an inner side of the inner formwork is provided or fastened. This can take place, for example, by welding. A concrete anchor 300 is guided at its first end 310 (FIG. 3) through the hole 240 in the inner formwork from an outer side and plugged into the holding unit 400 and is held there. After an outer formwork 210 is provided, the volume between the inner and outer formwork 220, 210 can be filled with concrete 230. A metal cage or a reinforcement can be provided between the inner and outer formwork 220, 210 in order to improve the mechanical stability of the precast concrete part. When the concrete is filled between the inner and outer formwork 220, 210, the concrete then also surrounds the concrete anchor 300. When the concrete of the concrete tower segment has a sufficient hardness, the outer and inner formwork 210, 220 can then be removed. The concrete anchor 300 is then securely held by the concrete 230 and attachment parts can be fastened to the concrete anchor 300.

At the first end 310 of the concrete anchor 300 there can be provided a removable element 410, such as, for example, a screw 410 which can be introduced into the holding unit 400 in order to hold the concrete anchor 300. After the removable element (for example a screw) has been removed, the concrete segment can be removed while the inner formwork 220 remains in its place (without the holding units 400 being removed), with the result that only the precast concrete part 200 with at least one concrete anchor 300 remains. The first end 310 of the concrete anchor 300 can be designed for example in such a way that installation parts or attachment parts can be fastened thereto in the interior of the tower of the wind turbine. This can be achieved, for example, by the provision of an (internal) thread.

After the concrete 230 has cured, the concrete anchor 300 is anchored sufficiently firmly in the precast concrete tower segment such that installation and attachment parts can be fastened to the concrete anchor or to its first end 310.

The holding unit 400 is fastened on the inner side of the inner formwork 220 in the region of the bores or holes 240. The holding unit 400 is designed such that a first end 230 of a concrete anchor or a removable element 410 provided on or in the first end can be introduced into the holding unit 400 in such a way that the concrete anchor is fastened by the holding unit 400, i.e., the concrete anchor is held by the holding unit. This fastening takes place, for example, by inserting the removable element 410 of the first end 310 of the concrete anchor through the hole 240 into the holding unit 400. After the concrete anchor 300 has been introduced into the holding unit by way of the removable element 410, the concrete anchor 300 is securely fastened, with the result that concrete 230 can then be introduced between the inner and outer formwork.

The provision of the holding unit 400 on the inner side of the inner formwork 220 means that only one person is required to fit the concrete anchor 230 since it is consequently possible for one person to fit the concrete anchor 300 from outside the inner formwork. The holding unit 400 can optionally be designed in such a way that an introduction of the first end 310 of the concrete anchor is possible, but a movement in the opposite direction is blocked.

The holding unit 400 can optionally have a spring action when introducing the concrete anchor and a locking action for the removal of the concrete anchor.

The holding unit serves for holding the concrete anchor in position during the production of the precast concrete tower segment without the concrete anchors having to be secured in any other way.

Figure 3:
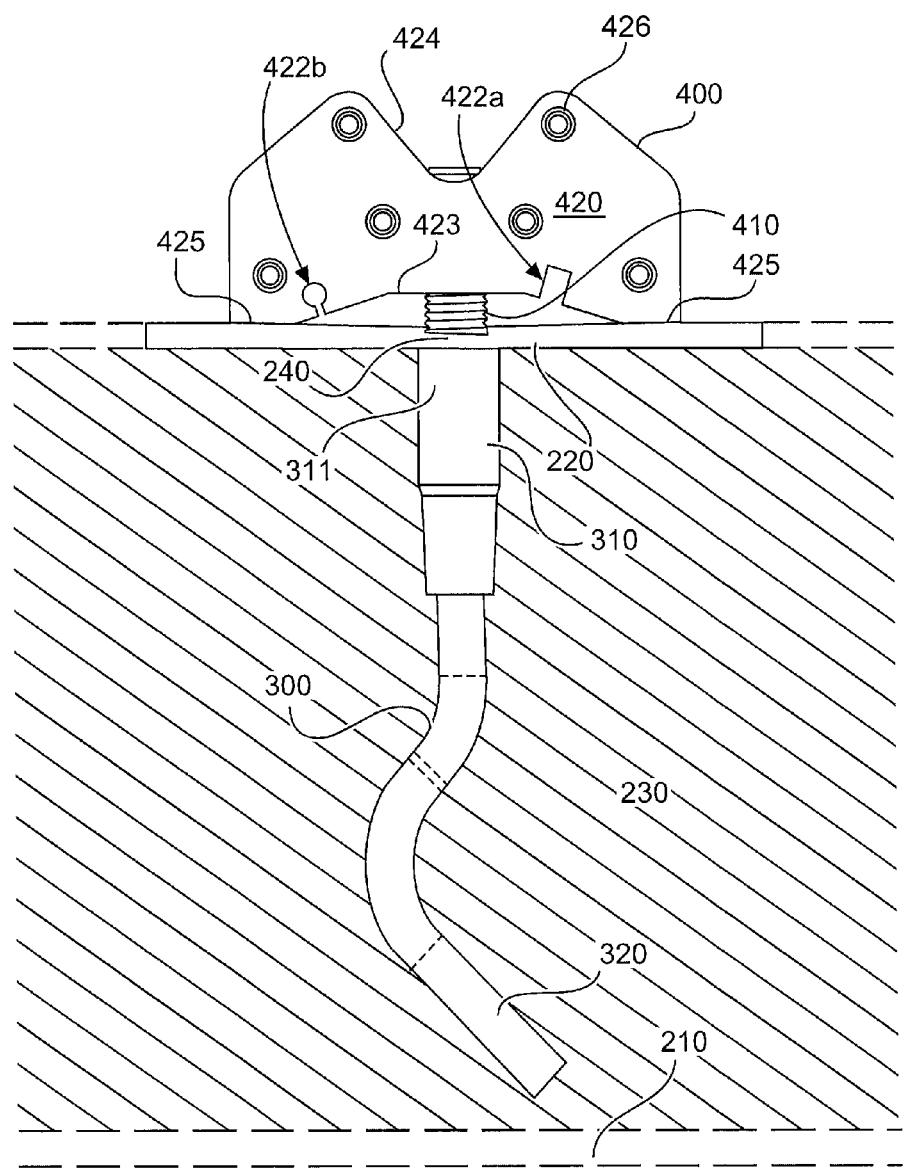
FIG. 3 shows a schematic sectional view of a detail of a precast concrete tower segment according to a second exemplary embodiment.

FIG. 3 shows a schematic sectional view of a detail of a precast concrete tower segment according to a second exemplary embodiment. The precast concrete tower segment according to the second exemplary embodiment can be based on the precast concrete tower segment according to the first exemplary embodiment of FIG. 2. A holding unit 400 is fastened in an inner side of the inner formwork 220, for example by welding. The holding unit 400 is provided in particular in the surrounds of bores 240 in the inner formwork 220. A concrete anchor 300 with a first end 310 which has a removable element 410 is introduced through the hole 240 into the holding unit 400. The holding unit 400 holds and locks the removable element 410, with the result that the concrete anchor 300 can no longer be removed.

The holding unit 400 can have two plates 420 which are arranged parallel to one another and can be fastened on or to one another by means of bolts 426. The plates 420 have at their first end two fastening portions 425 by means of which the holding unit 400 can be fastened to an inner formwork 220. The fastening can be achieved for example by means of welding. A cutout 423 and optionally mounting-facilitating portions 422a, 422b are provided between the two fastening portions 425, 425. The cutout 423 is provided so that emerging concrete can flow down through this cutout 423. The portions 422a, 422b serve to facilitate mounting.

The plates 420 each have a cutout 424 at their second end. The cutout 424 is provided so that the removable element 410 can be removed by a fitter, preferably after the concrete 230 has cured, with the result that the concrete anchor 300 can no longer move.

The concrete anchor 300 has a first end 310 and a second end 320. The first end 310 has an (internal) thread and is provided on the inner formwork 220. The second end 320 projects into the concrete 230. Attachment or installation parts can be fastened in the interior of the tower segment 200 by means of the internal thread 311 on the first end 310.

Figure 4A:
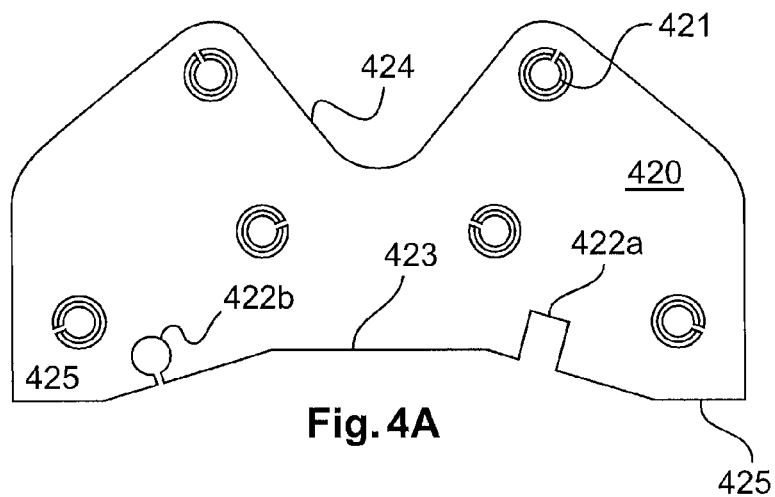
FIGS. 4A and 4B show two different schematic views of a holding unit according to the second exemplary embodiment.

FIG. 4A shows a plan view of a plate 420 of the holding unit according to the second exemplary embodiment. The plate 420 has at its one end the fastening portions 425 and, between them, the cutout 423 and the cutouts 422a, 422b which serve to facilitate mounting. A cutout 424 is provided at the second end of the plate 420. The plate 420 also has a plurality of openings or bores 421 for the bolts 426.

Figure 4B:
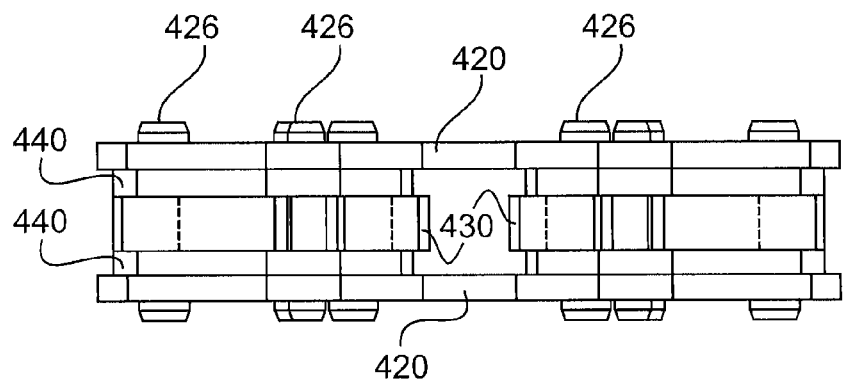

FIG. 4B shows a side view of the holding unit according to the second exemplary embodiment. The holding unit has two holding plates 420 arranged in parallel, spacer plates 440 and two holding elements 430. The holding elements 430 have a first resilient end 433, a latching portion 431 and a second end 434. The second end 432 is held by means of two bolts while the resilient end 433 is held by one bolt.

Figure 4C:
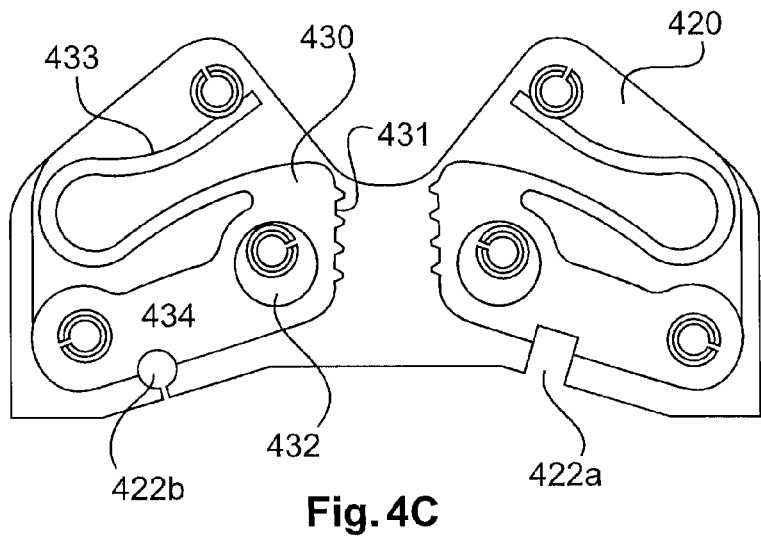
FIG. 4C shows a schematic sectional view of the holding unit of FIGS. 4A and 4B.

FIG. 4C shows a plan view of the holding unit with one of the plates 420 removed.

Figure 5:
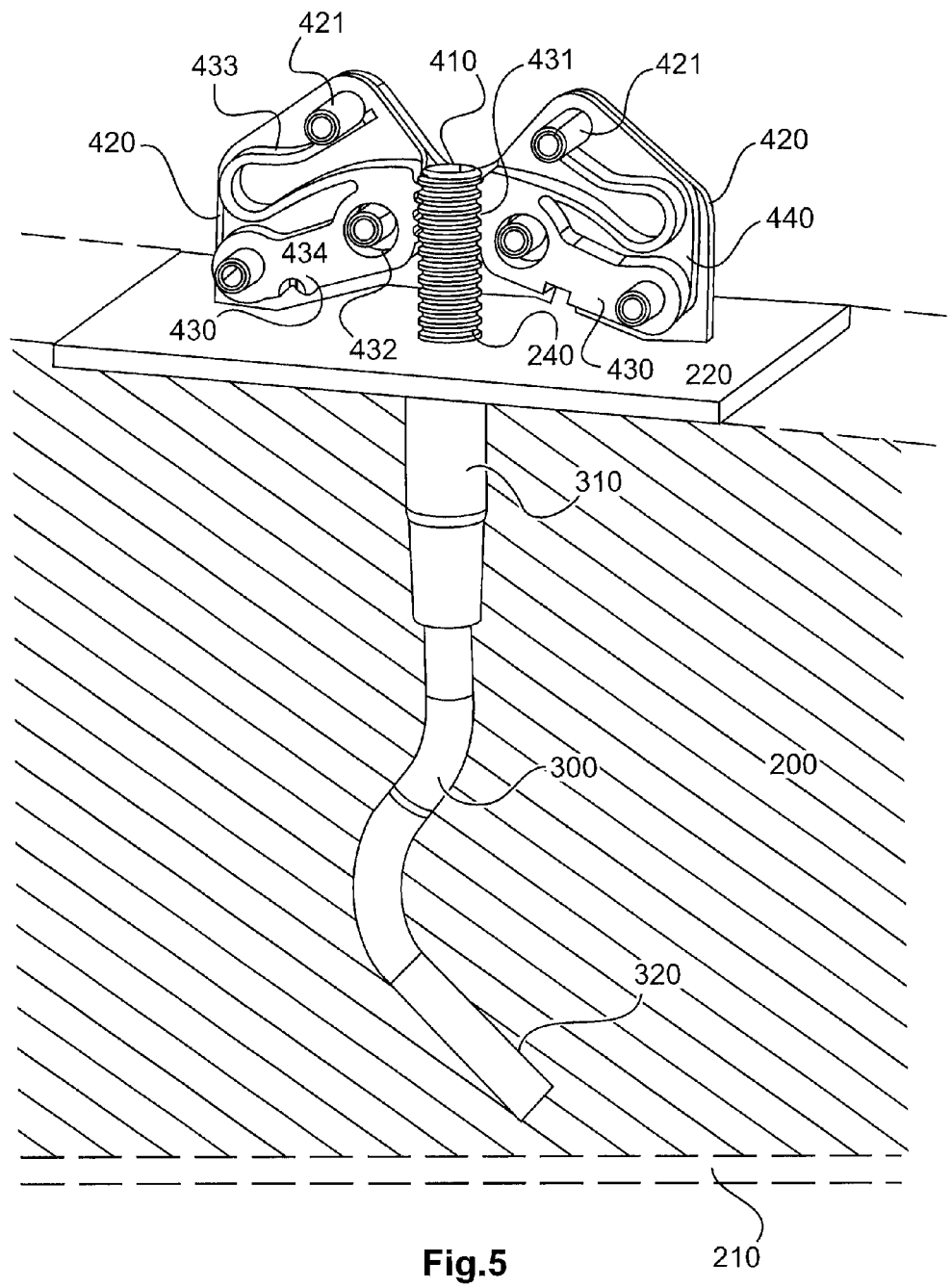
FIG. 5 shows a perspective sectional view of a detail of a precast concrete tower segment according to the second exemplary embodiment.

FIG. 5 shows a perspective sectional view of a holding unit. In the representation of FIG. 5, one of the plates 420 is omitted. In FIG. 5, the concrete anchor 300 is shown with its first and second ends 310, 320 a removable element 410 being fastened in the first end 310. The removable element 310 can take the form of a screw, for example, which is screwed into an (internal) thread 311 at the first end 310 of the concrete anchor. When mounting the concrete anchor 300, the first end is introduced with the removable element 410 through the bore 240 into a holding unit 400 fastened to the inner formwork 220. By means of the two latching portions 431, the holding unit 400 engages in an external thread of the removable element 410 and holds the removable element in the introduced position. The two latching portions 431 are each coupled to a spring 433 such that the latching action also has a spring action. By virtue of the design of the latching portions 431, the concrete anchor 300 with the removable element 410 can only be introduced into the holding unit, but not removed again.

According to an aspect of the present invention, the holding unit 400 can be designed in the form of clamping jaws. The clamping jaws can then be fastened or welded to the inner formwork from inside. The position of the holding elements 400 is determined by the position of the holes or bores 240 in the inner formwork 220. After the inner formwork 220 with the holding elements 400 fastened thereto has been mounted, a worker can introduce a concrete anchor 310 with a removable element, for example in the form of a hexagon socket screw, from outside the inner formwork through the bore 240 into the clamping jaw 400. Optionally, the concrete anchor can then be rotated by, for example, 40°, with the result that an external thread of the screw engages in noses on the latching portion 431 and the concrete anchor is thus drawn into the inner formwork for fastening. After the volume between the inner and outer formwork has been filled with concrete 230, the hexagon socket screw 410 can be unscrewed from the holding unit or from the clamping jaw and the inner formwork 220 can be removed.

During the production of the precast concrete tower segment of a wind turbine tower, a reinforcing cage can optionally be set or placed by means of a crane on an inner core with an inner formwork. Concrete anchors (for example a wavy anchor or a socket dowel) with a screwed-in threaded bolt can then be introduced or pressed into the holding units, which holding units are fastened to the inner side of the inner formwork. The concrete anchors can be used, for example, to fasten a tower ladder, a cable holder, etc. It is then possible (also after the cage has been placed on the inner core) for the outer formwork to be placed and for all concrete anchors to be positioned and screwed. Concrete can then be introduced into the formwork. After the concrete has cured, the threaded pins or the removable elements can be unscrewed from the holding units such that there is no longer any connection between the concrete segment and the inner formwork. The outer formwork can then be released and mounted such that the concrete segment is freely accessible from outside. The finished concrete segment can then be lifted, for example by means of a crane, from the inner formwork and can be further transported for further processing.

The invention claimed is:

1. A method comprising:
   producing a precast concrete tower segment of a wind turbine tower, wherein producing comprises:
      providing an inner formwork having a bore and a holding unit at an inner side of the inner formwork in a region of the bore;
      introducing a first end of a concrete anchor through the bore and into the holding unit in a first direction, wherein the holding unit holds the concrete anchor, wherein the holding unit is designed so that the first end of the concrete anchor can be introduced in the first direction and blocked in a second direction that is opposite the first direction, wherein the holding unit has first and second holding plates arranged parallel to each other, a spacer plate and first and second holding elements, wherein each of the first and second holding elements has a first resilient end, a latching portion, and a second end, wherein the first resilient ends of the first and second holding elements of the holding unit create a spring action when introducing the first end of the concrete anchor in the first direction and the latching portions of first and second holding elements create a locking action in the second direction;
      coupling a removable element to the first end of the concrete anchor;
      placing an outer formwork apart from the inner formwork by a space;
      pouring concrete in the space between the inner and outer formwork;
      removing the removable element from the first end of the concrete anchor; and
      removing the inner and outer formwork.

2. The method according to claim 1, wherein the first end of the concrete anchor has an internal thread, wherein the removable element has threads that mate with the internal threads of the concrete anchor.

3. The method according to claim 2, wherein internal threads of the first end of the concrete anchor are configured to secure attachment parts or installation parts to the tower segment.

4. A wind turbine tower comprising:
   a precast concrete segment that has been produced by the method according to claim 1.

5. A precast concrete tower segment formwork for producing a wind turbine tower, comprising:
   an inner formwork having a bore, and
   a holding unit on the inner formwork at a region of the bore, the holding unit including first and second holding plates arranged parallel to each other, a spacer plate and first and second holding elements, wherein the first and second holding elements have first resilient ends, latching portions, and second ends, respectively,
   wherein the holding unit is configured to hold a concrete anchor when a first end of the concrete anchor or a removable element at the first end of the concrete anchor is introduced from an outer side of the inner formwork through the bore and into the holding unit in a first direction, wherein the holding unit is designed so that the first end of the concrete anchor can be introduced in the first direction and blocked in a second direction that is opposite the first direction, wherein the first resilient ends of the first and second holding elements of the holding unit creates a spring action when the first end of the concrete anchor is introduced in the first direction and the latching portions prevent movement in the second direction.

6. A holding unit for holding a concrete anchor during the production of a precast concrete tower segment of a wind turbine tower, the holding unit comprising:
   at least one fastening portion for fastening the holding unit to an inner formwork, and
   at least one resilient holding element that allows a concrete anchor to be introduced in a first direction and prevents the concrete anchor from being removed in a second direction, wherein the second direction is opposite to the first direction, the holding unit including first and second holding plates arranged parallel to each other, a spacer plate and first and second holding elements, wherein the first and second holding elements have first resilient ends, latching portions, and second ends, respectively, wherein the first resilient ends of the first and second holding elements create a spring action when introducing a first end of the concrete anchor in the first direction and the latching portions of the first and second holding elements create a locking action in the second direction.

* * * * *